United States Patent
Narvaez

(10) Patent No.: US 7,260,095 B1
(45) Date of Patent: Aug. 21, 2007

(54) TECHNIQUE FOR DEALLOCATION OF MEMORY IN A MULTICASTING ENVIRONMENT

(75) Inventor: Paolo Narvaez, Sunnyvale, CA (US)

(73) Assignee: Raza Microelectronics, Inc., Cupertino, CA (US)

( * ) Notice: Subject to any disclaimer, the term of this patent is extended or adjusted under 35 U.S.C. 154(b) by 855 days.

(21) Appl. No.: 10/739,874

(22) Filed: Dec. 17, 2003

Related U.S. Application Data

(60) Provisional application No. 60/434,328, filed on Dec. 17, 2002.

(51) Int. Cl.
*H04L 12/56* (2006.01)
(52) U.S. Cl. ............ 370/390; 370/312; 370/392; 711/152; 711/149
(58) Field of Classification Search ............ 370/390, 370/389, 392, 312; 711/100, 149, 452
See application file for complete search history.

(56) References Cited

U.S. PATENT DOCUMENTS

| | | | | |
|---|---|---|---|---|
| 5,684,797 A | * | 11/1997 | Aznar et al. | 370/390 |
| 6,081,512 A | * | 6/2000 | Muller et al. | 370/256 |
| 6,226,685 B1 | * | 5/2001 | Chen et al. | 709/238 |
| 6,246,680 B1 | * | 6/2001 | Muller et al. | 370/389 |
| 6,324,178 B1 | * | 11/2001 | Lo et al. | 370/392 |

OTHER PUBLICATIONS

Kumar.S,Agrawal, D.P, On multicast support for shared-memory-based ATM switch architecture,Jan. 1996, network IEEE, vol. 10, 6 pages.*
Hung-Chang Hsiao, Chung-Ta King, Does multicast communication make sense in write invalidation trafic?, Jul. 2000, department of computer science, National Tsing Hua University, Hsinchu, Taiwan, 8 pages.*

* cited by examiner

*Primary Examiner*—Hassan Kizou
*Assistant Examiner*—Mounir Moutaouakil
(74) *Attorney, Agent, or Firm*—Pillsbury Winthrop Shaw Pittman LLP

(57) ABSTRACT

A technique deallocates memory in a multicasting environment, such as within a network device. The technique involves tracking the slowest member of a plurality of multicast members designated to receive an input packet or flow and, other than a deallocation request presented by the slowest member, blocking all deallocation requests from being allowed.

14 Claims, 5 Drawing Sheets

TECHNIQUE FOR DEALLOCATION OF MEMORY IN A MULTICASTING ENVIRONMENT

CROSS-REFERENCE TO RELATED APPLICATIONS

This application claims the benefit of priority under 35 U.S.C. §119(e) from U.S. Provisional Application No. 60/434,328 to Paolo Narvaez, filed Dec. 17, 2002 and entitled "Technique for Deallocation of Memory in a Multicasting Environment," which is incorporated by reference in its entirety and for all purposes.

BACKGROUND OF THE INVENTION

1. Field of the Invention

Generally, the present invention relates to the telecommunications and digital networking. More specifically, the present invention relates to the deallocation of memory in a multicasting network environment.

2. Description of the Related Art

In the realm of digital networking and telecommunications, data is often assembled and then transmitted and received in discrete units known as packets. Packets originating from the same source device, connection or application and terminating at the same destination devices, connections or applications can be grouped together in a "flow." Thus, a flow comprises one or more packets. Though the term "packets" is used in this discussion to define a flow, "packets" may also refer to other discrete data units, such as frames and the like. Network devices (e.g. switches, routers, etc.) that intercept and forward such flows are often configured with a plurality of ingress ports (i.e., ports into which "input" flows are received at the device) and a plurality of egress ports (i.e., ports from which "output" flows or packets are sent or routed away from the device). In this regard, and for purposes of discussion, ports may be physical, logical or a combination of physical and logical. When an input flow is received by a network device at an ingress port, it could be destined for output over one or more egress ports. An input flow destined for output over only one egress port is referred to as unicast (or a unicast flow), while an input flow with some integer number, n, of egress port destinations is referred to as multicast (or a multicast flow). In this way, a unicast flow can simply be considered as a multicast flow with n=1 destination egress ports.

The typical and most straightforward way of achieving multicasting is to request, and have resent, the multicast flow from the original source (i.e., the original source sends the input flow to the ingress ports of the network device) as many times as needed for subsequent transmission to each designated egress port. For numerous reasons apparent to those skilled in the art, however, such a straightforward multicasting mechanism is time-inefficient and consumes excessive amounts of network bandwidth.

FIG. 1 illustrates a more common approach to achieve multicasting for an input flow by performing data replication at the multicast point. As shown in FIG. 1, the packets of the input flow 110 are written to a memory device 100 such as a RAM (Random Access Memory). The memory device 100 captures the packets of the input flow 110 and stores them until all egress ports for which that flow is designated have read each packet. In the example shown, the input flow 110 is destined for four multicast "members" (i.e., those egress ports for which the flow is designated and destined) A, B, C and D. There may be more total egress ports within a network device than multicast members for a given input flow. The stored packet 110 is then read out from the memory device 100 as needed to fulfill the multicast requirement, which in this example is four times. This approach, called "replication," prevents the input packet or flow from having to be retransmitted from its original source multiple times, thereby improving efficiency.

However, since memory device 100 has a limited storage capacity, the memory device can become full of packets and unable to accept any more packet traffic. Also, after a packet of the multicast flow has been transmitted to all of its multicast destinations, it is no longer needed. For these reasons, a memory deallocation procedure is often applied to the memory device using a memory controller or other similar mechanism. In this way, the memory device can be freed from data that is no longer needed. The deallocation procedure must be able to recognize when the multicast input packet has been passed to all of its members.

Traditional deallocation procedures use a counter that first initializes to the number of designated multicast recipients (e.g., some or all of the egress ports on the network device) and then decrements each time the memory is accessed by a multicast member. However, such a deallocation technique does not perform well when the number of multicast input flows is very large (e.g., into the thousands or more), since a counter must be set and maintained for each input packet. Further, the counters and counter manipulation are typically handled outside of the input flow memory device itself, for example, in a memory controller or other external device. Thus, the memory controller adds excessive delay to the entire memory reading egress process.

Often, during the traditional deallocation procedure, each multicast member must signal to the counter (i.e., the memory controller) that it has finished reading the last packet of the input flow from the memory device. Thus, not only must the counter be accessible by every multicast member, it must be updatable by each member. Since a given packet of an input flow can only be read by one member at a time, this counter access/update creates one or more extra wait states that negatively affect multicasting performance. This means that the counter is locked by each multicast recipient and cannot be updated by subsequent recipients until that preceding recipient has finished. This problem is exacerbated where the multicast consists of a very large number of packets in the input flow. Further, it is possible that each of the multicast members may read out the flow at different rates of speed. Further still, where multicast members do not update in a synchronous fashion at even speeds, the counter can yield invalid results.

Thus, it would be advantageous to have a memory deallocation technique that overcomes these and other limitations and is scalable for very large numbers of flows existing within a single network device.

SUMMARY OF THE INVENTION

What is disclosed is a technique for deallocating memory in a multicast environment. The technique involves initializing multicast tracking, then tracking which member of those multicasts' members is the slowest in reading data and then blocking all other deallocation requests until a deallocation request from the slowest member is received. The tracking of the slowest member, according to at least one embodiment of the invention, involves keeping a list of pointers, one pointer per multicast member, for each input flow. The tracking begins by arbitrarily designating one of the members (and its pointer) as being the slowest and then updating this slowest pointer designation whenever a pointer to the slowest member has changed while other pointers maintain their previous state. Deallocation requests from this slowest member are then allowed and acted upon elsewhere in the network device such as at a memory controller.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

The invention in various embodiments is a system and technique for deallocating memory in a network device or any other similar device that is capable of multicasting data over multiple output ports. The technique involves tracking which input flows are unicast and which are multicast. For each multicast input flow, the technique involves determining which multicast member is the slowest in speed among the multicast members that are designated as destinations for the multicast input flow. Once the slowest multicast member is determined, deallocation requests from faster multicast members are blocked until the slowest member is ready to deallocate the memory.

Figure 1:
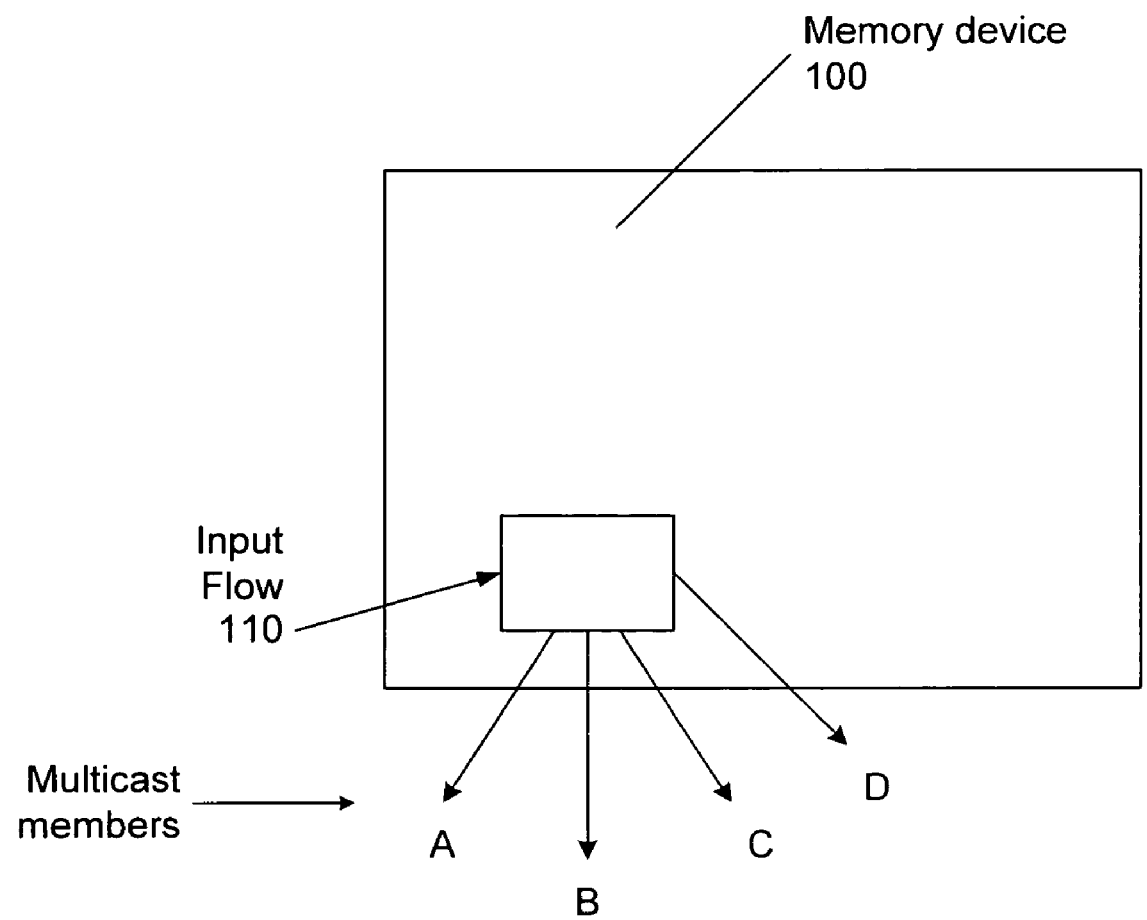
FIG. 1 shows a typical concept of multicasting.
Figure 2:
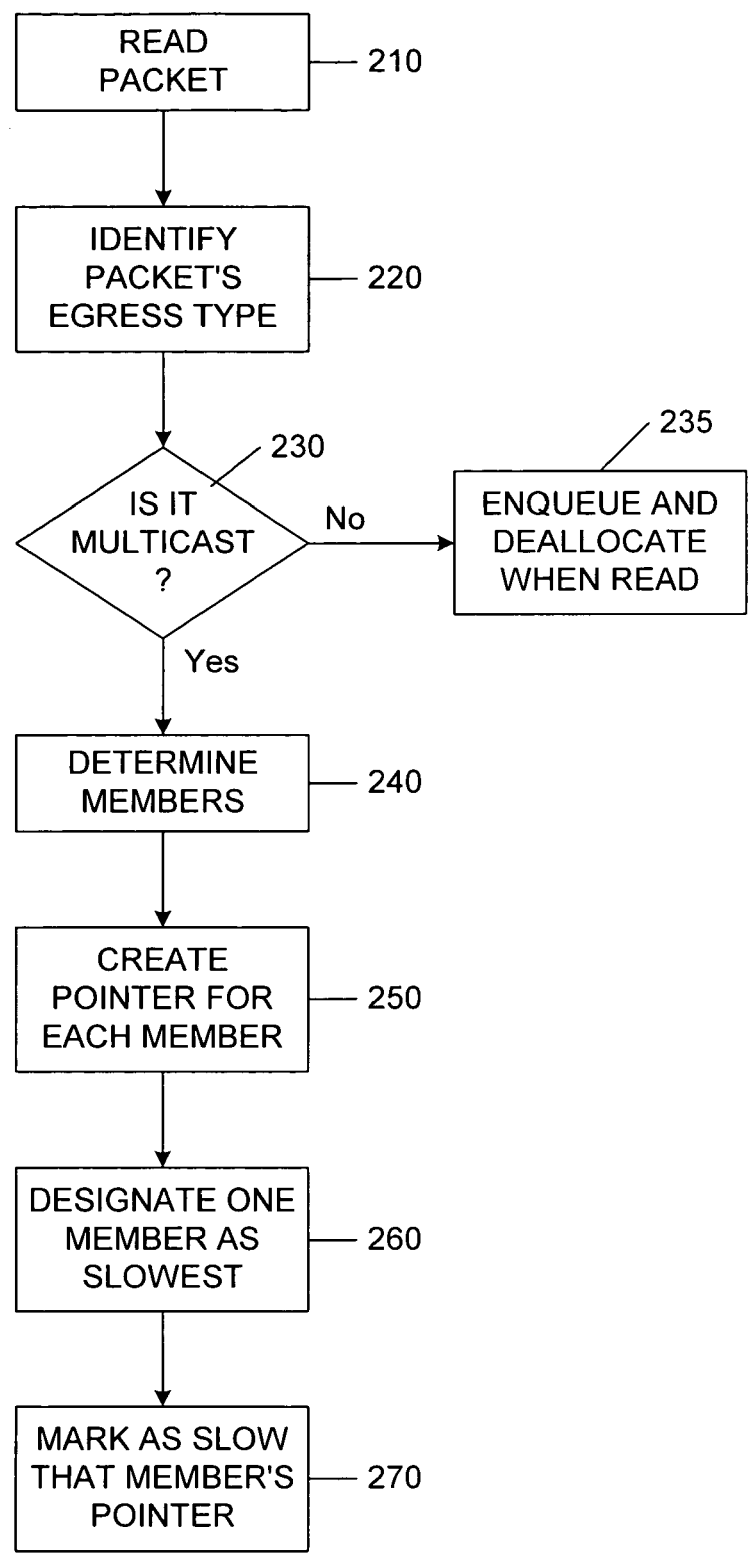
FIG. 2 illustrates a flowchart of multicast flow tracking initialization according to at least one embodiment of the invention.

FIG. 2 illustrates a flowchart of multicast flow tracking initialization according to at least one embodiment of the invention. Prior to a packet from an input flow being enqueued within the memory device, multicast tracking may need to be initiated. According to step 210, an input flow is first read from the input client interface(s) (see FIG. 5 below) via one or more ingress ports. Next, at step 220, the flow's egress type (e.g., unicast, multicast, etc.) is identified. Flow identification (ID) may be achieved, for example, by partitioning the possible universe of available flow IDs into two types only, unicast and multicast, and designating any flow IDs above a threshold as unicast and those below it as multicast. Further, the multicast membership of a given input flow, if it is multicast, may also be encoded in a device-internal ID. If the input flow is not multicast, as checked at step 230, then, for example, it may be assumed unicast. At step 235, the unicast flows are enqueued and the memory for those packets/flows is deallocated after the packet is read once. If the packet is multicast, the process flow continues to step 240.

At step 240, the multicast members are determined. This step is described in greater detail below. The multicast membership may include all or only a subset of the total available egress ports or channels. At step 250, a pointer is created for each multicast member. For each identified multicast flow, a linked list of such created pointers for each multicast member can be created and stored. The pointers contain the memory address of the next packet from the input flow to be transferred for each member. Because the packets of the input flow may not be stored in sequential memory locations, the flow-ordered addresses stored in the pointers may not be sequential. The pointers may be stored in the same memory as the packets of the input flow, or in a different memory. Next, at step 260, of all the multicast members designated for a particular input flow, one of the members is designated as being the slowest member. For example, this designation can be completely arbitrary. Per step 270, the designated slowest member's pointer is then marked as "slow."

This initial setup of FIG. 2 may precede flow write to memory or may be concurrent with or after such writing, provided that the multicast flows are not sent out an egress port prior to this setup being accomplished. Once the multicast tracking initialization has occurred, the multicast flow is ready for reading out via one or more egress ports that correspond to the designated and identified multicast members (further discussed below, in relation to FIG. 4).

Figure 3:
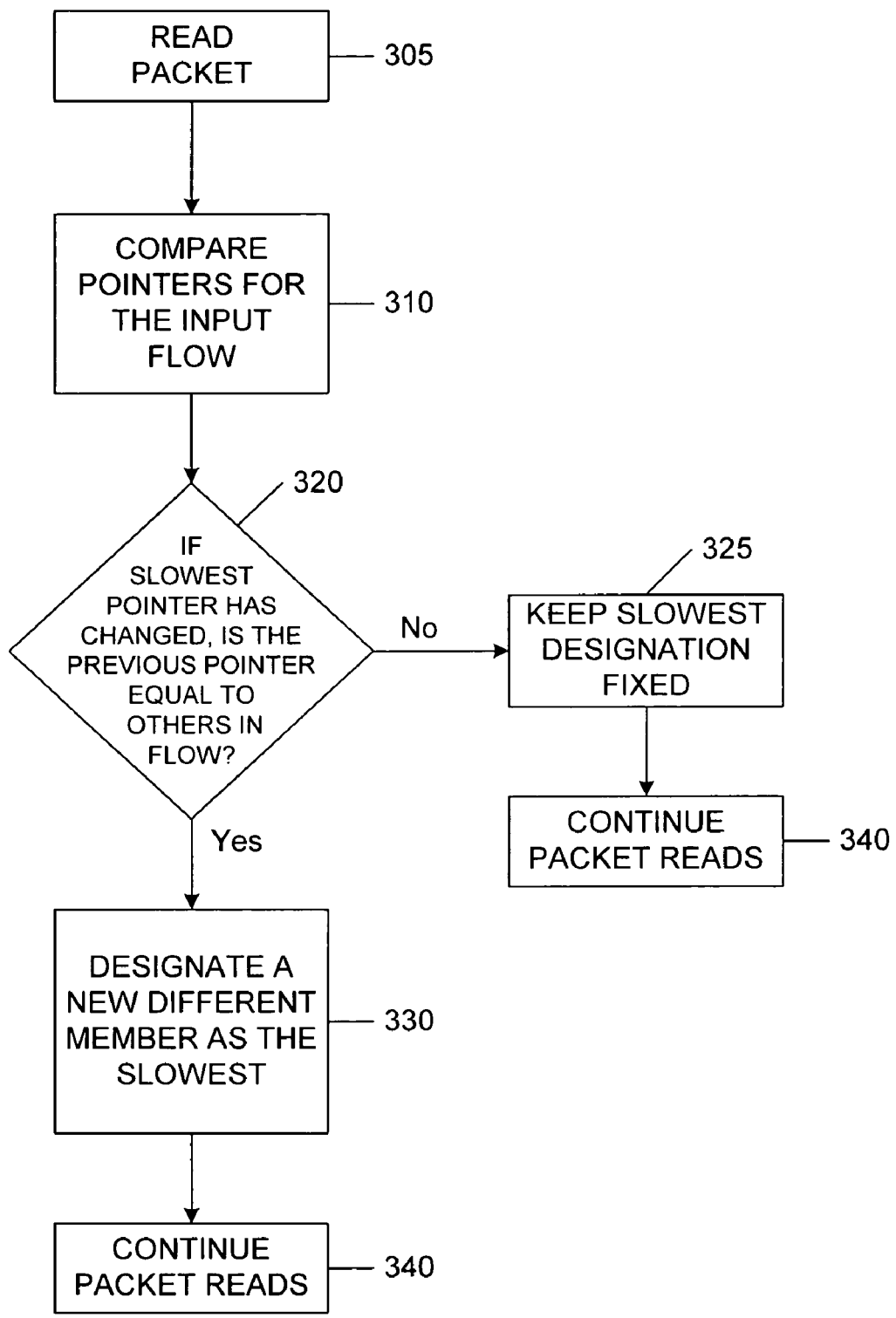
FIG. 3 illustrates tracking and resolving the slowest multicast member according to at least one embodiment of the invention.

FIG. 3 illustrates tracking and resolving the slowest multicast member according to at least one embodiment of the invention. In this embodiment, the slowest member is one that has not transferred more packets from the input flow than any of the other members of that same input flow. The slowest member tracking procedure begins at step 305 as a packet of a flow is read out to one multicast member. After a packet of the flow is read out to a member, pointers for all of the members of that input flow are compared at step 310. The comparison takes the form shown in step 320: if the slowest multicast member pointer has changed, is the previous pointer to the changed pointer of the slowest member equal to any of the other current member pointers from the other multicast flows? The slowest member pointer will change after that member as read out a packet of the flow. So, if a pointer from other members of the flow remains in the same state as that slowest member's previous pointer, then that slowest member has transferred more data than the other members. Thus, a new slowest member should be selected. If the comparison from step 320 yields false, then the previously designated slowest member, and its associated pointer, retains its status at step 325 and is kept fixed as the "slowest." Then at step 340 packet reads continue, with control flow proceeding to back to step 310.

If the comparison of step 320 yields true, then the previously designated slowest member is no longer the slowest of all the multicast members in that flow because it has transferred more packets from the flow than other members of the flow. Thus, at step 330, the procedure arbitrarily designates as slowest a new and different member among those that have not changed their previous state (that is, those members that the previously designated slowest member has no surpassed in data transferred). Along with this designation, the pointer for the new slowest member would be marked as such. Packet reads are then continued at step 340 with control flow proceeding to back to step 310, such that pointer comparisons are performed upon packet reads. When this final resolution of slowest members occurs, the deallocation request attempt by the true "slow" member that reads the packet last will be accepted.

Figure 4:
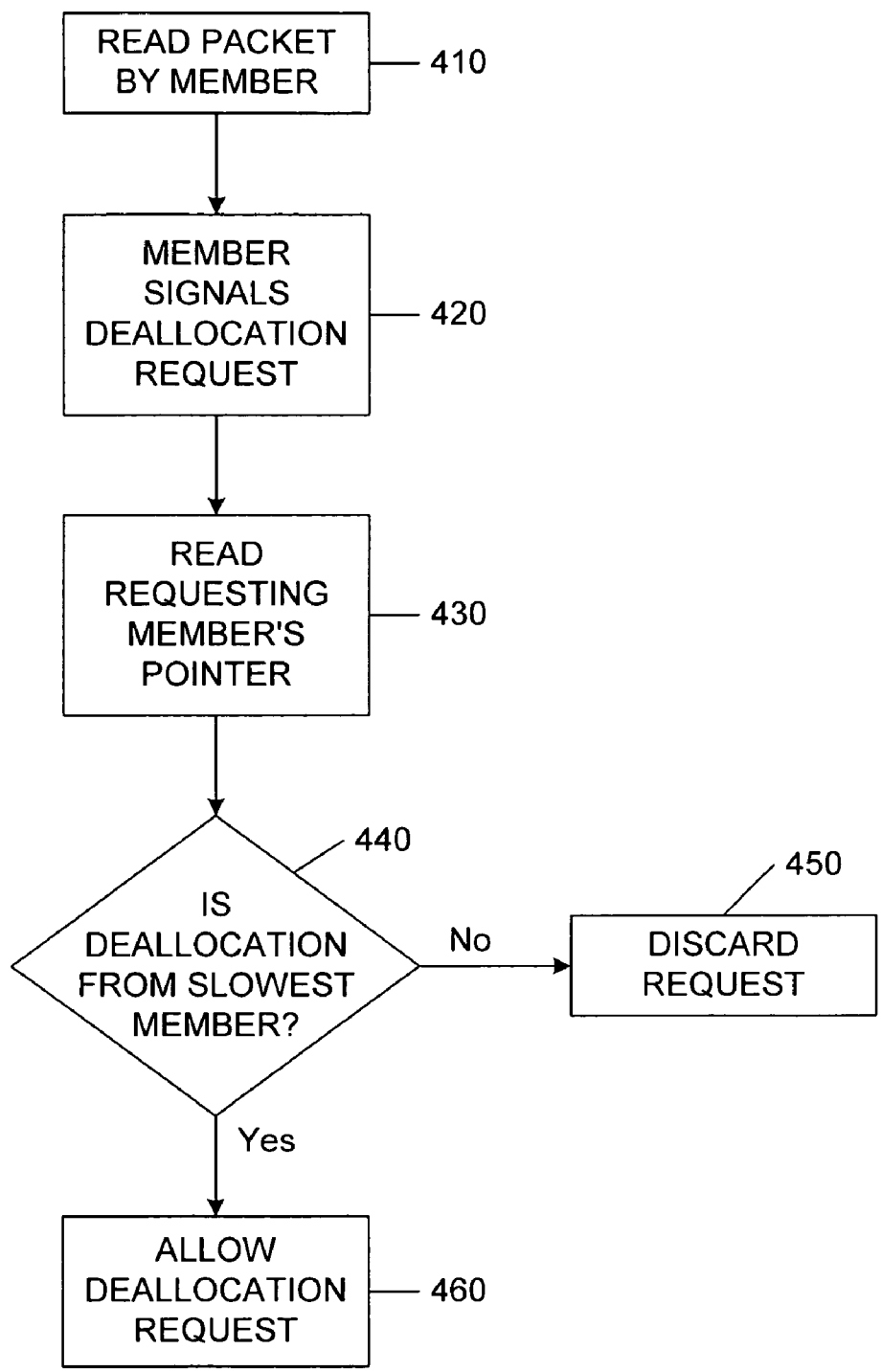
FIG. 4 illustrates the reading and deallocation procedure of multicast members according to at least one embodiment of the invention.

FIG. 4 illustrates the reading and deallocation procedure of multicast members according to at least one embodiment of the invention. First, as shown in step 410, a packet from the flow is read by a multicast member. At step 420, once the packet has been read, the member sends a request back to the device from where the packet was sent and stored to deallocate that packet. However, before the deallocation request can be accepted or honored, all multicast members for that packet or flow must have finished reading the packet from the memory. To ensure that all multicast members have read out the packet, the requesting member's pointer is read at step 430 to see whether that deallocation request has come from the slowest member at step 440. If the deallocation request is not from the slowest member, then the deallocation request is ignored or discarded, as shown at step 450. The logic is that, until the slowest member makes the deallocation request, it may not have been possible for all other members to have read out that packet. Likewise, once the slowest member makes the deallocation request, then all members should have had the time read out the packet. At step 460, if the deallocation request is from the slowest member, then that request is allowed to proceed and can be further resolved.

Figure 5:
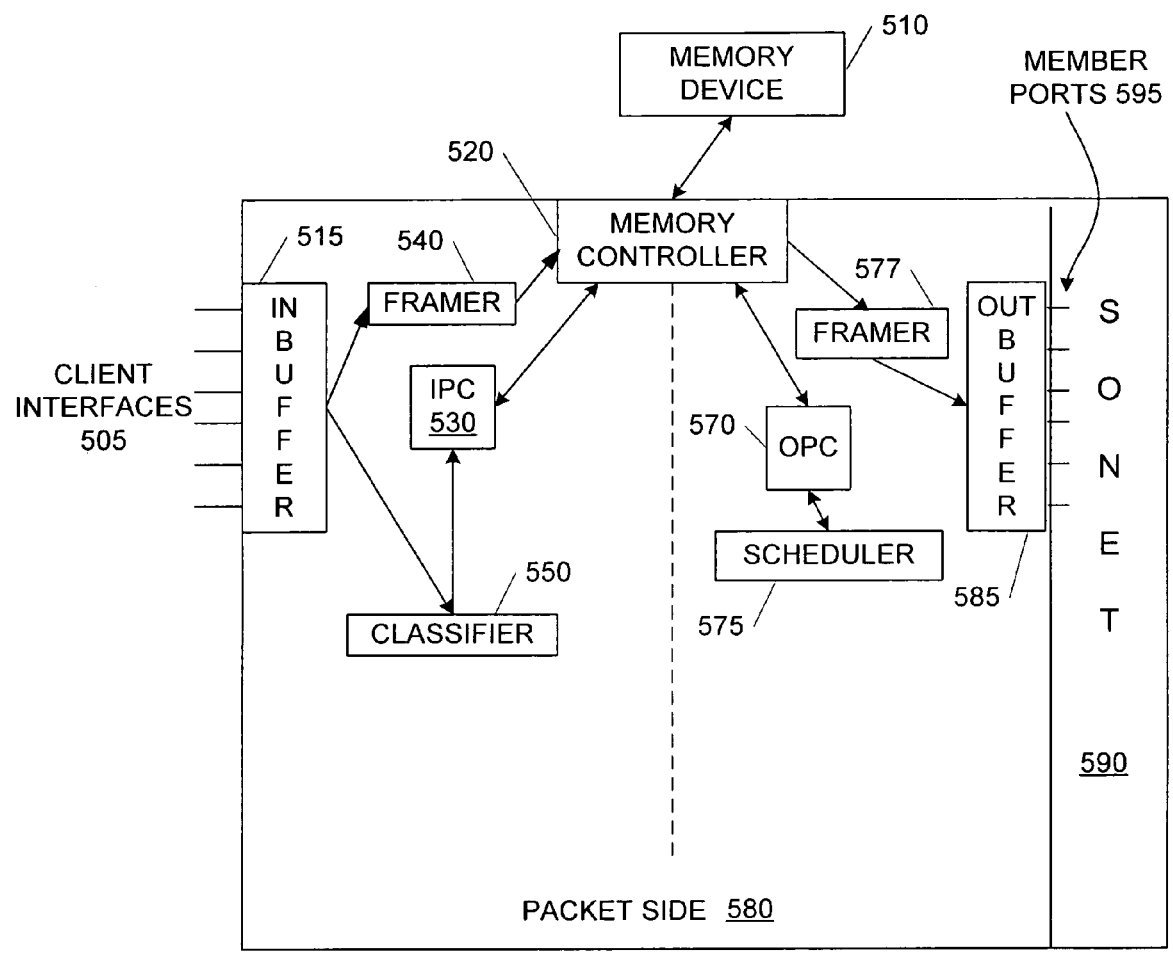
FIG. 5 illustrates a system in which multicast deallocation techniques according to at least one embodiment of the invention can be employed.

FIG. 5 illustrates a system in which multicast deallocation techniques according to at least one embodiment of the invention can be employed. System 500 is an exemplary network device that accepts input data in the form of packets, flows, etc. from a plurality of client interfaces 505 originating on a "packet" side 580 and sends output data over member ports 595 and, for example, eventually onto a SONET side 590. The packet side 580 has two buffers, an input buffer 515 and an output buffer 585, which may consist of separate, shared or multiple hardware or software memories and are also referred to as "queues." Buffers 515 and 585 hold data and other traffic that is routed through device 500.

Device 500, according to one embodiment of the invention, is thus an exemplary network device or processor that couples the traffic of a packet-based network(s), such as Ethernet, over and out onto high-bandwidth networks such as a SONET (Synchronous Optical NETwork) ring, which may have a plurality of channels and/or ports. Thus, the device 500 has a packet side 580 and transports data to member ports 595 on a SONET side 590. Such a configuration often leads to data being multicast to more than one member port while originating on the packet side 580 from a single data unit or flow.

An IPC (Input Packet Control) mechanism 530 regulates the timing/control of writing of packets via memory controller 520 and onto memory device 510. The PC has other functions, which are not a subject of this invention. A framer 540 is inserted into the data path between input buffer 515 and memory controller 520 to format the data as needed. Input buffer 515 is also coupled to a classifier 550, which sends control information to the IPC 530.

When packets are sent over member ports 595, their transport is governed in a sequencing sense by an OPC (Output Packet Control) mechanism 570 which couples to memory controller 520 and signals when data is to be read out of memory device 510. OPC 570 also performs other functions, which are not specifically a subject of the invention, such as the control and communication with a scheduler 575. A framer 577 is inserted in the output data path between memory controller 520 and output buffer 585 to format packet data in manner appropriate for member ports 595.

The multicast initialization, flow identification, slowest member tracking, and read and deallocation request management procedures described above and with respect to various embodiments of the invention can be implemented as a part of the memory controller 520 or as part of the IPC 530 and/or OPC 570 as well as implemented as standalone blocks which communicate with the various components of the device 500. Packets are written to and read from memory device 510, and thus the memory controller 520, having the most central position in the architecture shown, would be well-suited to performing the various procedures and techniques outlined in various embodiments of the invention.

Although the present invention has been particularly described with reference to the preferred embodiments thereof, it should be readily apparent to those of ordinary skill in the art that changes and modifications in the form and details thereof may be made without departing from the spirit and scope of the invention. For example, those skilled in the art will understand that variations can be made in the number and arrangement of steps illustrated in the above block diagrams. Further, those skilled in the art will understand that some steps can be combined and some divided. It is intended that the appended claims include such variations, combinations, divisions and modifications.

What is claimed is:

1. A method for deallocating a memory in a networking device, the method comprising the steps of:
    reading an input flow to identify a multicast flow;
    determining a plurality of members for the multicast flow;
    creating a pointer for each of the plurality of members;
    designating one of the plurality of members as a slowest member;
    marking as slow the pointer of the slowest member;
    reading-out packets of the multicast flow from the memory of the networking device to the plurality of members for the multicast flow;
    receiving a deallocation request from each of the plurality of members;
    examining the pointer associated with each of the plurality of members making the deallocation request; and
    fulfilling the deallocation request for the pointer marked as slow.

2. The method according to claim 1 further including, before the step of reading, the step of writing-in packets of the input flow to the memory of the networking device.

3. The method according to claim 1 wherein the step of reading further includes simultaneously writing-in packets of the input flow to the memory of the networking device.

4. The method according to claim 1 wherein the step of designating further includes arbitrarily designating the slowest member from among the plurality of members.

5. The method according to claim 1 wherein the step of reading-out further includes the steps of:
    evaluating, after each packet read-out, the pointer for each of the plurality of members for the multicast flow to check whether the pointer of the slowest member has changed;

comparing, if the pointer of the slowest member has changed, a previous pointer of the slowest member to the pointers from all other members of the plurality of members of the multicast flow;

assigning, if the previous pointer matches one or more of the other members' pointers, a new member from among the matching members as a new slowest member; and re-marking as slow the pointer of the new slowest member.

6. The method according to claim 5 wherein the step of assigning further includes arbitrarily assigning the new slowest member from among the matching members.

7. A system for deallocating a memory in a networking device comprising:

means for reading an input flow to identify a multicast flow;

means for determining a plurality of members for the multicast flow;

means for creating a pointer for each of the plurality of members;

means for designating one of the plurality of members as a slowest member;

means for marking as slow the pointer of the slowest member;

means for reading-out packets of the multicast flow from the memory of the networking device to the plurality of members for the multicast flow;

means for receiving a deallocation request from each of the plurality of members;

means for examining the pointer associated with each of the plurality of members making the deallocation request; and means for fulfilling the deallocation request for the pointer marked as slow.

8. The system according to claim 7 further including, before the means for reading, means for writing-in packets of the input flow to the memory of the networking device.

9. The system according to claim 7 wherein the means for reading further includes means for simultaneously writing-in packets of the input flow to the memory of the networking device.

10. The system according to claim 7 wherein the means for designating further includes means for arbitrarily designating the slowest member from among the plurality of members.

11. The system according to claim 7 wherein the means for reading-out further includes:

means for evaluating, after each packet read-out, the pointer for each of the plurality of members for the multicast flow to check whether the pointer of the slowest member has changed;

means for comparing, if the pointer of the slowest member has changed, a previous pointer of the slowest member to the pointers from all other members of the plurality of members of the multicast flow;

means for assigning, if the previous pointer matches one or more of the other members' pointers, a new member from among the matching members as a new slowest member; and means for re-marking as slow the pointer of the new slowest member.

12. The system according to claim 11 wherein the means for assigning further includes means for arbitrarily assigning the new slowest member from among the matching members.

13. A method for deallocating a memory in a networking device, the method comprising the steps of:

determining a plurality of members for a multicast flow;

creating a pointer for each of the plurality of members;

designating one of the plurality of members as a slowest member;

marking as slow the pointer of the slowest member;

reading-out packets of the multicast flow from the memory of the networking device to the plurality of members for the multicast flow, wherein the step of reading-out further includes the steps of:

evaluating, after each packet read-out, the pointer for each of the plurality of members for the multicast flow to check whether the pointer of the slowest member has changed;

comparing, if the pointer of the slowest member has changed, a previous pointer of the slowest member to the pointers from all other members of the plurality of members of the multicast flow;

assigning, if the previous pointer matches one or more of the other members' pointers, a new member from among the matching members as a new slowest member; and re-marking as slow the pointer of the new slowest member; and fulfilling a deallocation request from each of the plurality of members for the pointer marked as slow.

14. A system for deallocating a memory in a networking device, comprising:

means for determining a plurality of members for a multicast flow;

means for creating a pointer for each of the plurality of members;

means for designating one of the plurality of members as a slowest member;

means for marking as slow the pointer of the slowest member;

means for reading-out packets of the multicast flow from the memory of the networking device to the plurality of members for the multicast flow, and further including:

means for evaluating, after each packet read-out, the pointer for each of the plurality of members for the multicast flow to check whether the pointer of the slowest member has changed;

means for comparing, if the pointer of the slowest member has changed, a previous pointer of the slowest member to the pointers from all other members of the plurality of members of the multicast flow;

means for assigning, if the previous pointer matches one or more of the other members' pointers, a new member from among the matching members as a new slowest member; and means for re-marking as slow the pointer of the new slowest member; and means for fulfilling a deallocation request from each of the plurality of members for the pointer marked as slow.

* * * * *